UNITED STATES PATENT OFFICE.

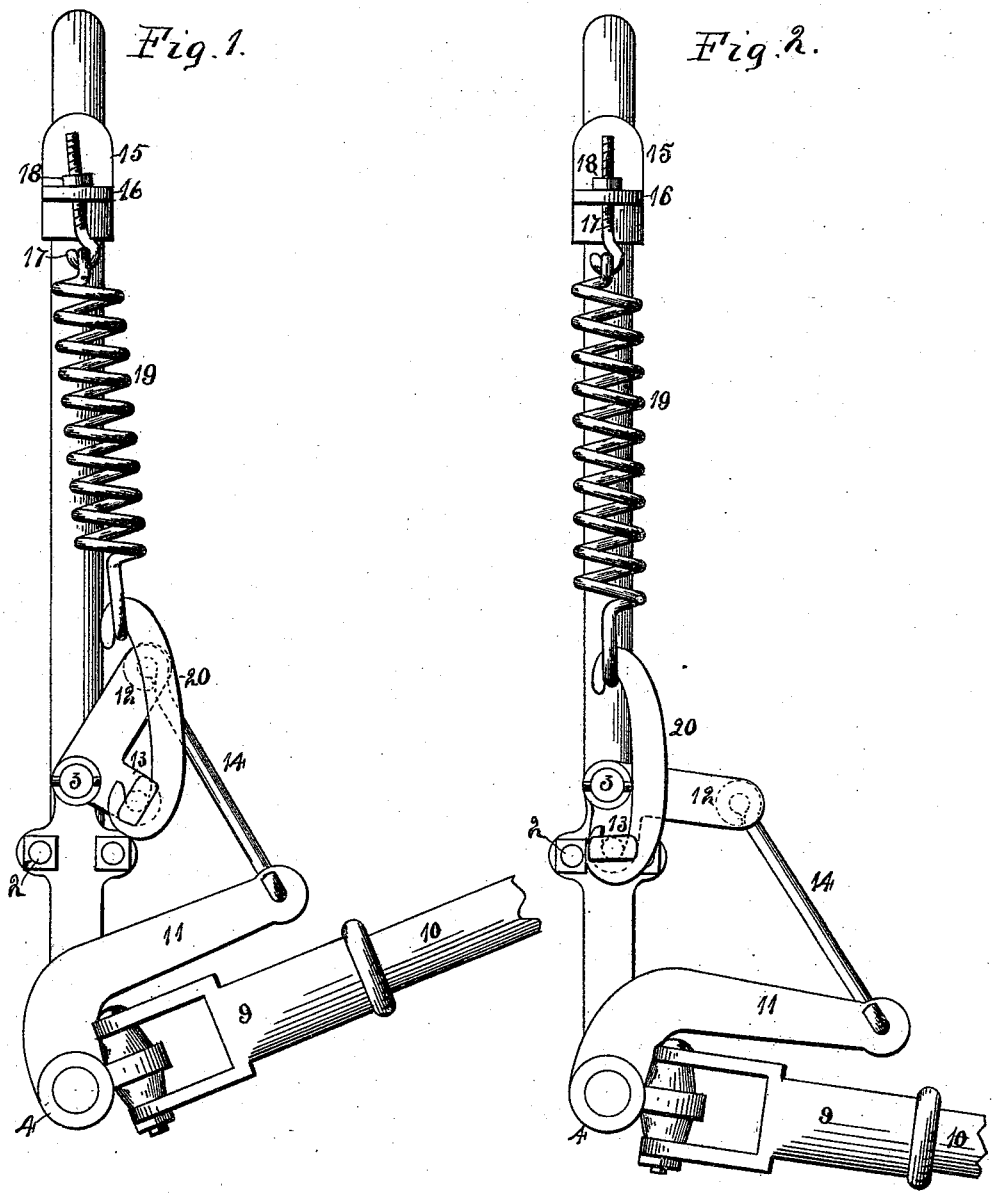

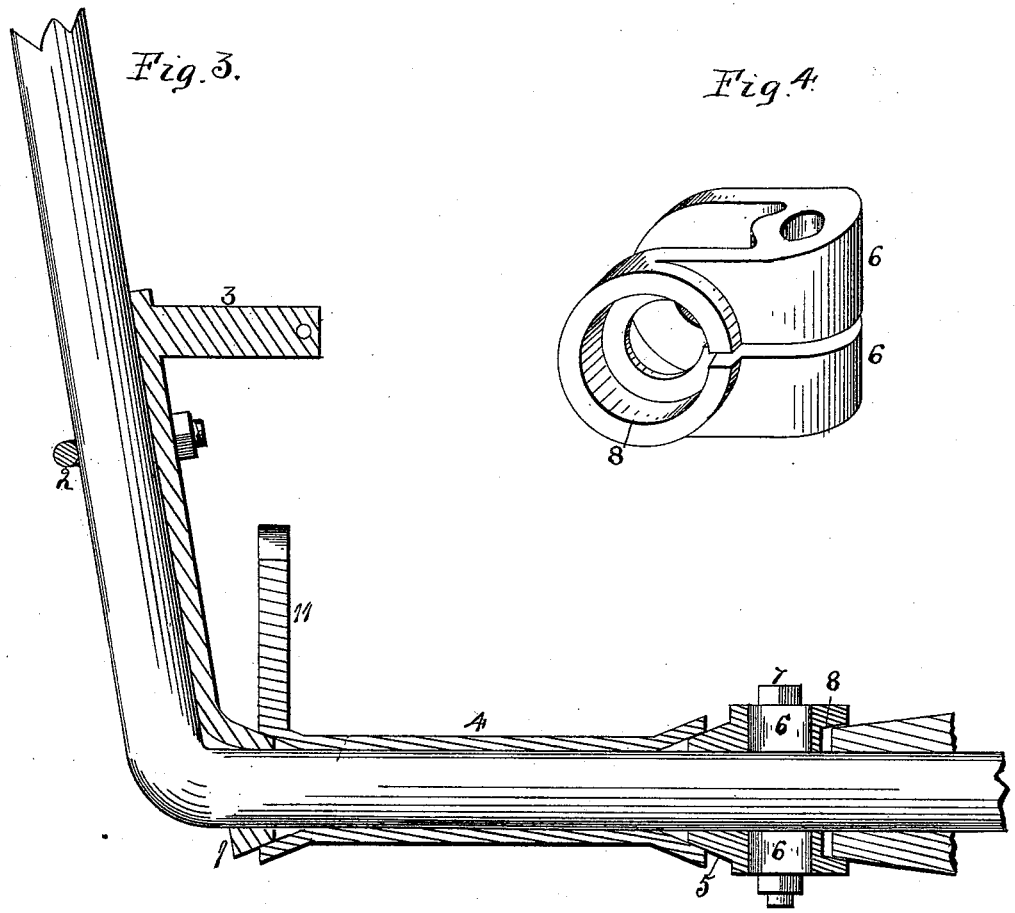

WILLIAM H. TRAPHAGEN, OF ROCKFORD, ILLINOIS, ASSIGNOR TO EMERSON, TALCOTT & CO.

CULTIVATOR.

SPECIFICATION forming part of Letters Patent No. 538,053, dated April 23, 1895.

Application filed December 12, 1894. Serial No. 531,607. (No model.)

*To all whom it may concern:*

Be it known that I, WILLIAM H. TRAPHAGEN, a citizen of the United States, residing at Rockford, in the county of Winnebago and State of Illinois, have invented certain new and useful Improvements in Cultivators, of which the following is a specification.

In the accompanying drawings, Figure 1 is a side elevation of the axle of a walking cultivator in which the drag bar is somewhat elevated. Fig. 2 is a similar view in which the drag bar is depressed to its fullest extent. Fig. 3 is a vertical section through the sleeve and its supports. Fig. 4 is an isometrical representation of one of the adjustable supports for the sleeve.

Over the horizontal portion of the axle is slipped a bracket having its lower end 1, in tapering form, and secured to the upwardly inclined portion by a clip 2, and from the upper end of the bracket extends a horizontal stud 3. A sleeve 4, has its ends provided with tapering openings and is placed upon the horizontal portion of the axle, so that the tapered opening of one of its ends will embrace the tapered lower end of the bracket I. A collar shown at Fig. 4, is placed upon the axle outside of the sleeve and has its inner end 5, tapering to fit the outer end of the sleeve. This collar is split and is provided with lugs 6, through which a bolt 7, passes clamping the collar in its connection with the axle. The outer end 8, of the collar is recessed and serves as a sand cap for the inner end of the wheel hub which is located upon the axle outside of the collar. To the sleeve 4, is connected a yoke 9, to which the drag bar 10, is connected. From the inner end of the sleeve rises an arm 11, which extends upwardly and rearwardly having its end perforated. Upon the horizontal stud 3, is located a bell crank lever composed of the long arm 12, and short arm 13, the ends of each being provided with a stud, one extending inwardly and the other outwardly. A link 14, forms a connection between the longer arm of the bell crank lever and the rearwardly extending arm connected to the sleeve.

Near the upper end of the inclined portion of the axle is secured a bracket 15, having an ear 16, extending horizontally and is provided with a vertical opening, and in this opening is placed a screw threaded hook 17, having a nut 18, located on the upper face of the ear. To this hook is connected a spiral spring 19, its lower end being connected to the short arm 13, of the bell crank lever through the medium of a link 20.

In use the action of the spring is to hold the drag bar elevated and to assist in raising it from the ground and by the employment of the bell crank lever as the tension of the spring diminishes the leverage will increase, thereby giving a substantially uniform lift upon the drag bar, and when the drag bar is at its lowest point the center of the spring's action will be slightly rearward of the center of the support for the bell crank lever which is held in this position by the front face of the link 20, coming in contact with the rear face of the hub portion of the bell crank lever, and the spring will assist in lifting the drag bar from the start.

By the employment of the cone shaped supports for the sleeve all wear may be taken up by moving the adjustable collar along the axle and firmly clamping it when adjusted.

I claim as my invention—

1. A spring lifting device for cultivator drag bars, consisting of a sleeve having a rearwardly extending arm, a bell crank or compensating lever having a pivotal connection with a stationary support, a link connecting the rearwardly extending arm and the longer arm of the bell crank lever, a spring having a connection at one end with the stationary support and its other end having a link connection with the shorter arm of the bell crank lever, this link constructed and operating substantially as and for the purpose described.

2. A spring lifting device for cultivator drag bars, consisting of a sleeve having a rearwardly extending arm, a bell crank or compensating lever having a pivotal connection with the stationary support, a link connecting the rearwardly extending arm and the longer arm of the bell crank lever, a spring having an adjustable connection at one end with the stationary support and its other end having a link connection with the shorter arm of the bell crank lever, this link constructed and operating substantially as and for the purpose described.

3. In a cultivator a sleeve having its ends in conical form and conical supports for the sleeve, one of the supports consisting of a collar made adjustable to and from the sleeve.

4. In a cultivator a sleeve having one or both ends in conical form and a conical support or supports for the sleeve one of the supports being made adjustable to and from the sleeve.

WILLIAM H. TRAPHAGEN.

Witnesses:
A. D. BEHEL,
E. BEHEL.